United States Patent [19]
Carrithers et al.

[11] Patent Number: 5,956,695
[45] Date of Patent: Sep. 21, 1999

[54] FILTER PROCESSOR AND METHOD FOR IMPLEMENTING A PROGRAM

[75] Inventors: David C. Carrithers; Steven G. Rapp; Gayla L. Stone; Jody A. Storey-Waller; Kim A. Resch; Kelly K. McGuire; Toni L. Ashby; Mark Jackson, all of St. Louis County; Lowell Huff, Manchester, all of Mo.

[73] Assignee: Maritz, Inc., Fenton, Mo.

[21] Appl. No.: 08/969,093

[22] Filed: Nov. 12, 1997

Related U.S. Application Data

[63] Continuation of application No. 08/620,041, Mar. 21, 1996, Pat. No. 5,689,100, which is a continuation-in-part of application No. 08/408,690, Mar. 21, 1995, abandoned.

[51] Int. Cl.$^6$ .............................. G06F 17/60; G06F 7/08; G06F 7/04

[52] U.S. Cl. ................................... 705/14; 705/26; 705/39

[58] Field of Search ................................ 705/39, 41, 44, 705/26, 27, 14

[56] References Cited

U.S. PATENT DOCUMENTS

| | | | |
|---|---|---|---|
| 4,194,242 | 3/1980 | Robbins | 364/200 |
| 4,334,270 | 6/1982 | Towers | 364/300 |

(List continued on next page.)

FOREIGN PATENT DOCUMENTS

| | | | |
|---|---|---|---|
| 2-76097 | 3/1990 | Japan | 235/380 |
| 2-264395 | 10/1990 | Japan | 235/380 |
| 404067295 | 3/1992 | Japan | 235/380 |
| 404070992 | 3/1992 | Japan | 235/380 |
| 404086990 | 3/1992 | Japan | 235/380 |
| 404242890 | 8/1992 | Japan | 235/380 |
| 405233957 | 9/1993 | Japan | 235/380 |
| 406096293 | 4/1994 | Japan | 235/380 |
| 406103422 | 4/1994 | Japan | 235/380 |
| 2076201 | 11/1981 | United Kingdom | G07C 1/10 |
| 2161629 | 1/1986 | United Kingdom | G06F 15/44 |
| 2184029 | 6/1987 | United Kingdom | A63F 9/22 |

OTHER PUBLICATIONS

AC Delco, "Sales Allowance Program," 1988, 4 pages.
AC Delco, "Sales Allowance Program," 1988, 5 pages.
"Order Entry / Bank Account System,".
"Trav Pass Pocket Guide," Feb. 1995, pp. i–ii, 1–65.
Smart Card Monthly, "News," IC/Smart Cards Take A Cruise Jan. 1994, pp. 8–9.
Incentive Marketing, "Smart Cards," Sep. 1994, pp. 84, and 87–89.
Giorgianni, "Free & Dear, Incentive Credit Cards Result in Big Charges," Oct. 14, 1994, 1 page, St. Louis Post Disp.
Mastercard, "A Major New Market for Acquirers," 1993, 20 pp.

(List continued on next page.)

*Primary Examiner*—Allen R. MacDonald
*Assistant Examiner*—Michele Stuckey Crecca
*Attorney, Agent, or Firm*—Senniger, Powers, Leavitt & Roedel

[57] ABSTRACT

A debit card system for implementing an incentive award program for a customer having participants. A plurality of debit cards, each assigned to one participant and having a unique account number corresponding to an award account of the participant is part of the system. A bank filter processor accesses program data including data identifying the authorized unique account numbers of the participants, data identifying the authorized merchants and data indicating the balance in each participant's award account. The filter processor compares this program data to the following transaction data: the initiating account number of the card as initiating the transaction, the merchant identification data of the initiating merchant, and the data regarding the amount of the initiated transaction. The filter processor generates validating data for the transaction when the evaluated transaction data indicates that the transaction has been initiated by an authorized merchant using the unique account number of one of the participants having a sufficient balance in the participant's corresponding award account to cover the transaction. Otherwise, invalidating data is generated.

28 Claims, 7 Drawing Sheets

U.S. PATENT DOCUMENTS

| | | | |
|---|---|---|---|
| 4,346,442 | 8/1982 | Musmanno | 364/408 |
| 4,597,046 | 6/1986 | Musmanno | 364/408 |
| 4,694,397 | 9/1987 | Grant et al. | 235/379 X |
| 4,739,478 | 4/1988 | Roberts et al. | 235/379 X |
| 4,742,457 | 5/1988 | Leon et al. | 235/379 X |
| 4,750,119 | 6/1988 | Cohen et al. | 364/401 |
| 4,876,592 | 10/1989 | Von Kohorn | 358/84 |
| 4,908,761 | 3/1990 | Tai | 364/401 |
| 4,941,090 | 7/1990 | McCarthy | 364/405 |
| 4,992,940 | 2/1991 | Dworkin | 364/401 |
| 5,007,641 | 4/1991 | Seidman | 273/138 A |
| 5,010,485 | 4/1991 | Bigari | 364/408 |
| 5,025,372 | 6/1991 | Burton et al. | 364/406 |
| 5,056,019 | 10/1991 | Schultz et al. | 264/405 |
| 5,117,354 | 5/1992 | Long et al. | 364/401 |
| 5,117,355 | 5/1992 | McCarthy | 364/405 |
| 5,128,752 | 7/1992 | Von Kohorn | 358/84 |
| 5,185,695 | 2/1993 | Pruchnicki | 364/401 |
| 5,192,854 | 3/1993 | Counts | 235/375 |
| 5,200,889 | 4/1993 | Mori | 364/401 |
| 5,202,826 | 4/1993 | McCarthy | 360/405 |
| 5,287,268 | 2/1994 | McCarthy | 364/405 |
| 5,297,026 | 3/1994 | Hoffman | 364/408 |
| 5,319,542 | 6/1994 | King, Jr. et al. | 364/401 |
| 5,353,218 | 10/1994 | De Lapa et al. | 364/401 |
| 5,367,561 | 11/1994 | Adler et al. | 379/93 |
| 5,450,938 | 9/1995 | Rademacher | 194/206 |

OTHER PUBLICATIONS

Washington Post, William F. Powers, "For More Consumers, Electronic Money is the Way to Pay," Jan. 10, 1994.

New York Times, "Executive Must Sell Stored on Debit Cards," Apr. 24, 1992.

American Banker, King, "Q: Which Brand of National Debit Card Did you Choose, and Why?" Feb. 7, 1994, vol. 159, No. 25, p. 17(1).

American Banker, Barthel, "College–Age Debit Card Users Receptive to New Payment Opinions, Survey Finds," Mar. 25, 1994 vol. 159, No. 58, p. 28(1).

Time, Thomas McCarroll, "No Checks. No Cash. No Fuss?" May 8, 1994, pp. 60–61.

Time, John Greenwald, "The Fee of Free Flying," May 9, 1994, p. 62.

Incentive, Judy Quinn, "The Latest Grenade in the Plastic War," Apr. 1994, one page.

Fortune, "Cashless Buying Creeps Ahead," Fortune, Sep. 21, 1992, one page.

New York Times, John Holusha, "Mastercard and Visa in a Debit–Card Battle," May 5, 1992, pp. D1 and D20.

Mastercard, "A Major New Market for Issuers," 1994.

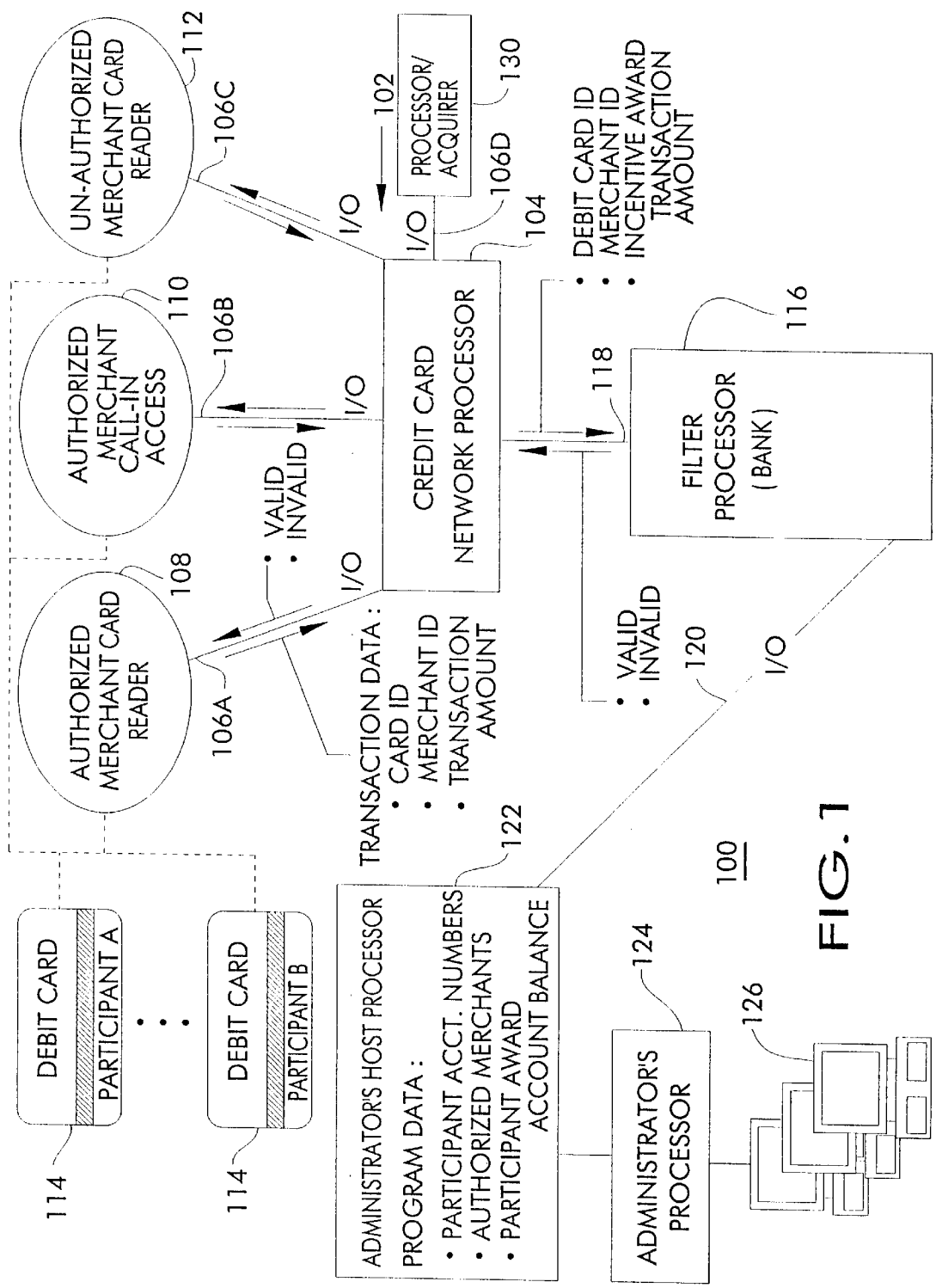

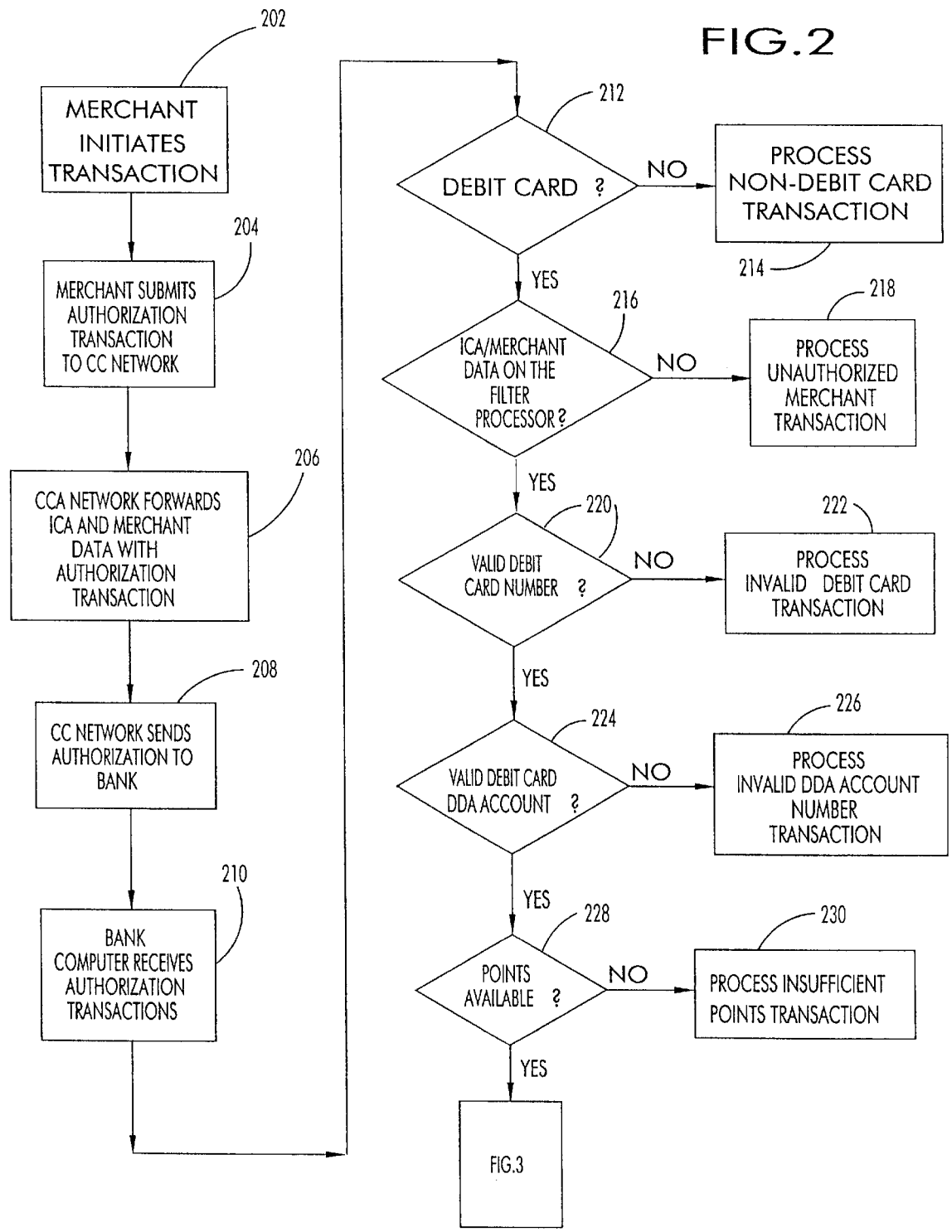

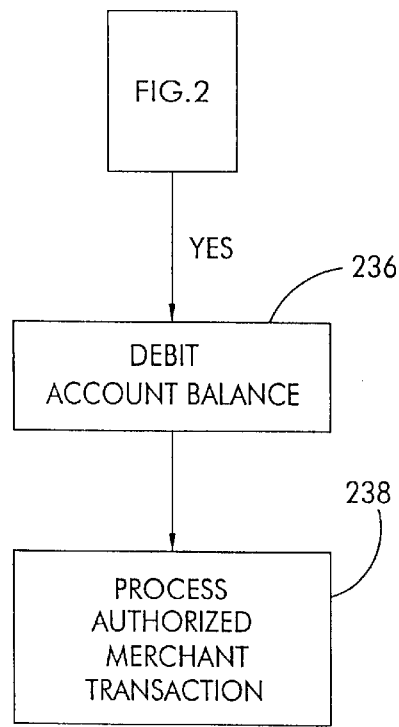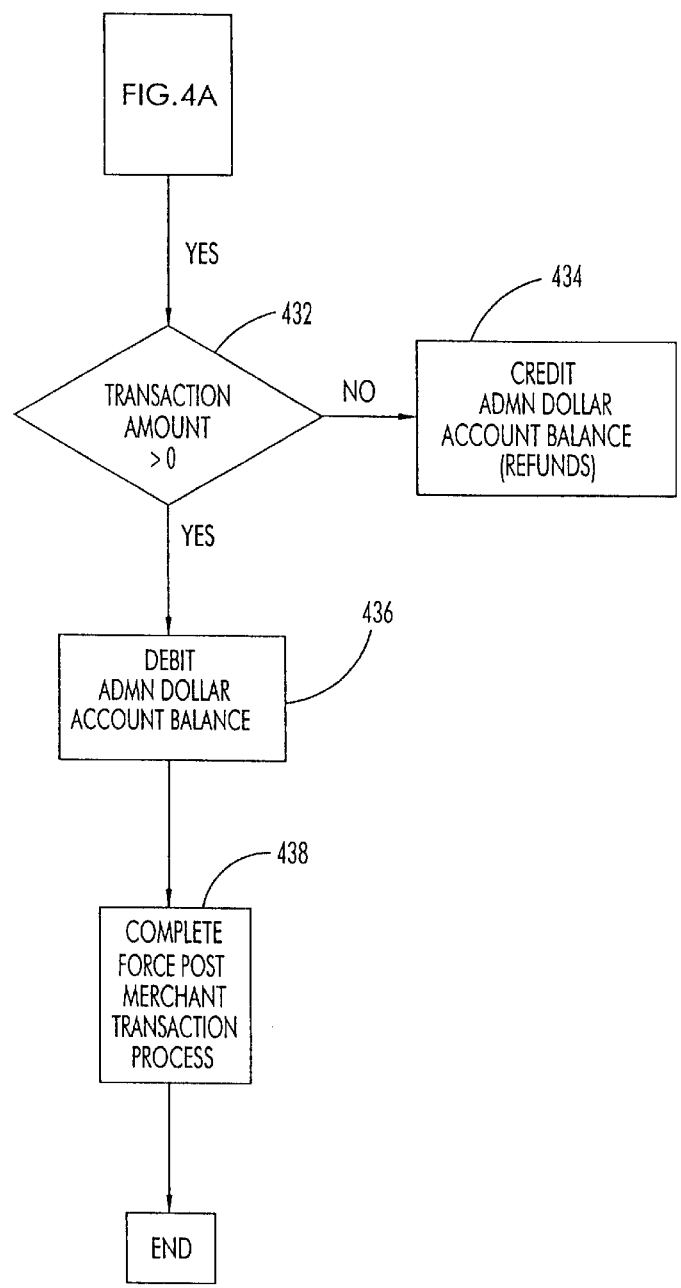

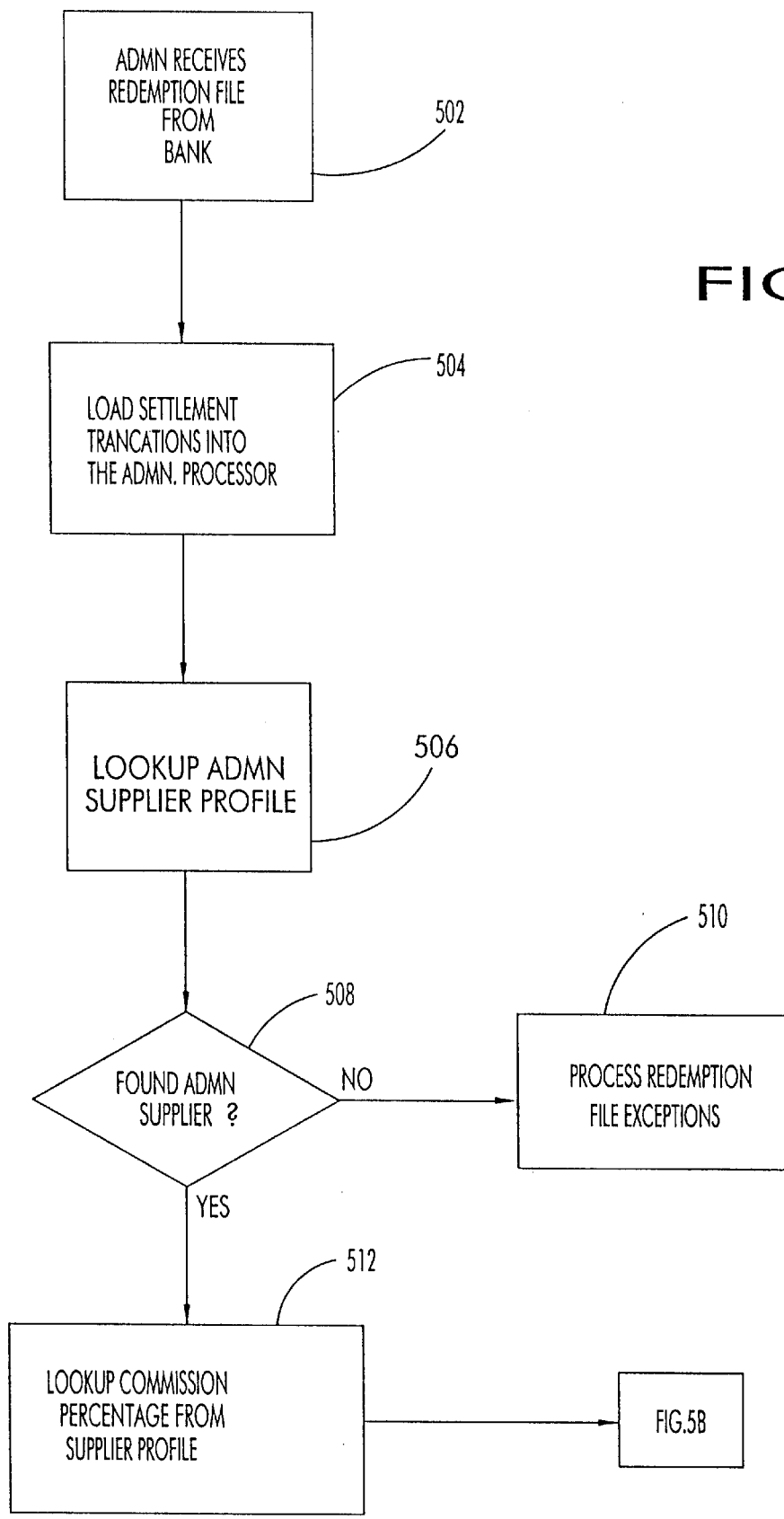

FILTER PROCESSOR AND METHOD FOR IMPLEMENTING A PROGRAM

This is a continuation of application Ser. No. 08/620,041, filed Mar. 21, 1996, now U.S. Pat. No. 5,689,100 which is a continuation-in-part of Ser. No. 08/408,690, filed Mar 21, 1995, now abandoned.

NOTICE

Copyright© 1996 Maritz, Inc. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention.

The invention relates to a computer and data processing system for implementing an incentive award program and, in particular, a system which employs debit cards allowing participants to purchase rewards by electronic debit transactions.

2. Description of the Prior Art.

Motivational programs are well-known in the prior art. In general, such programs have been administered by incentive companies which have contracted with a sponsoring company for providing a motivational or incentive program to promote the sales of the sponsoring company's products or services or to improve the performance of the sponsoring company's personnel. Based on various criteria, such as a participant's performance, the participant accumulates points over a period of time. Computer programming and data processing have been used to report to the participants the number of points that have been achieved at certain periods of time during the program. When the participant decides to take advantage of the awarded points, the participant is generally provided with a voucher or other paper documents which entitles the participant to obtain products or services.

Although such systems are highly effective, they can be expensive to administer and the paperwork involved in maintaining such systems can be extensive. There is a need for an incentive award program system which minimizes the paperwork needed to administer the system and, in particular, minimizes or eliminates the paperwork needed to support a transaction by which a participant obtains rewards.

SUMMARY OF THE INVENTION

It is an object of this invention to provide a system for implementing an incentive award program which employs debit cards. It is another object of this invention to provide a system which implements an incentive award program which minimizes or eliminates the need for paperwork to support transactions by which participants obtain rewards, and track such said earnings, redemption and accounts. It is another object of this invention to provide a system for implementing an incentive award program which employs debit cards bearing identification of the customer or sponsor of the incentive award program. It is another object of this invention to provide a system for implementing an incentive award program which uses debit cards rather than credit cards, but allows debit transactions at the time of sale to be transparent to merchants and so that merchants can process debit transactions using debit cards of the invention in a similar manner to the processing of credit card transactions. All merchants who accept cards for payment (including credit and debit) are part of the/a card transaction settlement system including: issuing banks, card associations, acquiring institutions, transaction processing, etc.

The invention comprises a system for implementing an incentive award program for a sponsor customer having participants. The program permits the participants to obtain as a award products and/or services from authorized merchants who are part of the incentive award program and who are part of a credit/debit card network. The credit/debit card network also includes unauthorized merchants who are not part of the incentive award program but who are part of a credit/debit card network. Each merchant has access via an input/output (I/O) port to a credit/debit card network processor of transactions. The system comprises a plurality of debit cards, a filter processor and software, responsive to a debit transaction initiated by a merchant using an initiating card having an initiating account number, for transmitting debit transaction data from the credit/debit card network processor to the filter processor. Each debit card is assigned to one participant and has a unique account number corresponding to an award account of the participant. The filter processor accesses the following program data: data identifying the authorized unique account numbers of the participants, data identifying the authorized merchants accepting such said debit card, and data indicating the balance in each participant's award account. The filter processor interfaces with the credit/debit card network processor. The credit/debit card network processor has software responsive to a transaction initiated by a merchant using an initiating card having an initiating account number, for transmitting to the filter processor the following debit transaction data: the initiating account number of the card initiating the debit transaction, merchant identification data of the initiating merchant, and data regarding the amount of the initiated debit transaction. The filter processor includes software for evaluating the debit transaction data transmitted to the filter processor by the credit/debit card network processor by comparing the debit transaction data to the program data. The filter processor evaluating software includes software for generating validating data for the debit transaction when the evaluated debit transaction data indicates that the debit transaction has been initiated by an authorized merchant using the unique account number of a participant having a sufficient balance in the participant's corresponding award account to cover the debit transaction. The filter processor evaluating software includes software for generating invalidating data for the debit transaction when the evaluated debit transaction data indicates that the initiating account number is not one of the authorized account numbers. The filter processor evaluating software includes software for generating invalidating data for the debit transaction when the evaluated debit transaction data indicates that the initiating merchant is not one of the authorized merchants. The filter processor evaluating software includes software for generating invalidating data for the debit transaction when the evaluated debit transaction data indicates that the balance in the award account corresponding to the initiating account number is insufficient to cover the amount of the initiated debit transaction. The filter processor includes software for transmitting the validating or invalidating data to the credit/debit card network processor. The credit/debit card network processor provides the validating or invalidating data for the evaluated debit transaction to the initiating merchant.

Other objects and features will be in part apparent and in part pointed out hereinafter.

BRIEF DESCRIPTION OF THE DRAWINGS

FIG. 1 is a block diagram of a system according to the invention illustrating the hardware components and their interconnection.

FIGS. 2 and 3 are flow charts illustrating the decision steps of the invention as implemented by the various hardware components shown in FIG. 1 during a pre-authorization debit transaction.

FIGS. 4A and 4B are flow charts illustrating the decision steps of the invention as implemented by the various hardware components shown in FIG. 1 during a force post debit transaction.

FIGS. 5A and 5B are flow charts illustrating the decision steps of the invention as implemented by the various hardware components shown in FIG. 1 during a settlement/commissions debit transaction.

Corresponding reference characters indicate corresponding parts throughout the drawings.

DETAILED DESCRIPTION OF THE PREFERRED EMBODIMENTS

Figure 4A:
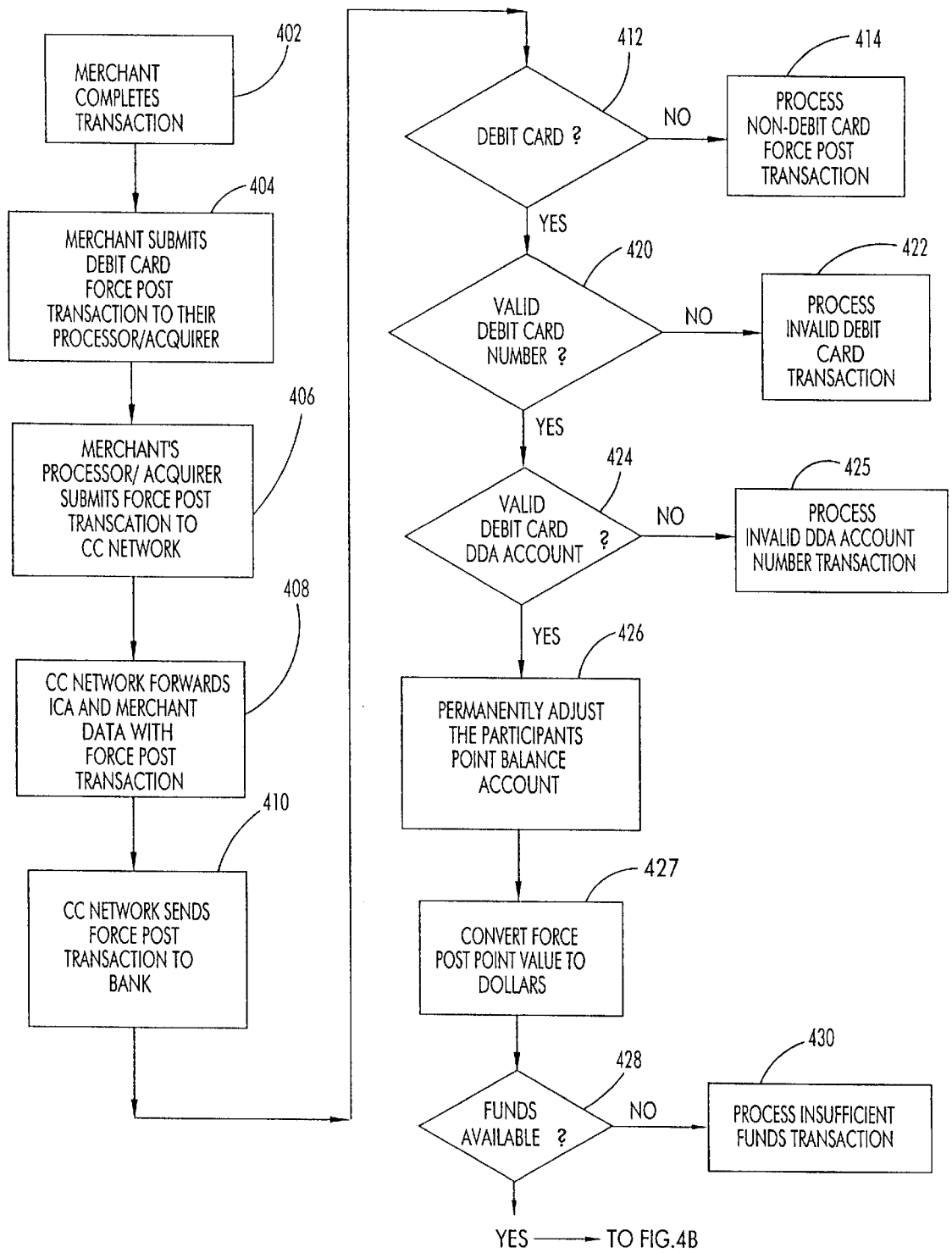

One preferred embodiment of hardware of a debit card system 100 according to the invention is illustrated in block diagram form in FIG. 1. Debit card system 100 implements an incentive award program managed by an administrator for a customer having participants who are part of the incentive award program. As used herein, an incentive award program may be any incentive plan or policy used to encourage or reward the participant, the participant's performance, the participant's use of particular merchants which sell goods and/or services, or a combination of these. Frequently, such programs are referred to as loyalty, frequency, affinity, retention, or performance improvement programs. This is because such programs encourage or improve participant loyalty, affinity, retention, quality of performance or frequency of performance. The program permits the participants to obtain as a motivational award products and/or services from authorized merchants who are part of the incentive award program. As part of the incentive award program, authorized merchants have a contractual and/or business relationship with the administrator and have agreed to participate in the incentive award program and the handling of debit transactions and commissions as described in more detail below.

The debit card system 100 of the invention may be preferably implemented as part of a pre-existing credit/debit card network 102 in which the authorized merchants participate. Such credit/debit card networks tend to be worldwide and rather extensive so that it is contemplated that such networks may also include unauthorized merchants who are not part of and who are not participating in the incentive award program but who are a part of and who are participating in the credit/debit card network.

In general, credit card network 102 implements the debit card system 100 and includes a credit/debit card network processor 104 having a plurality of input/output (I/O) ports 106 which would form the credit card network by interconnecting merchants 108, 110 and 112, such as by phone lines. As illustrated in FIG. 1, merchant 108 is an authorized merchant having a card reader which accesses the credit card network processor 104 via I/O port 106A. Merchant 110 is also an authorized merchant having access to the credit card network processor 104 via I/O port 106B by call-in access. In other words, merchant 110 places a call to a third party having access to the credit/debit card network processor 104 via I/O port 106B by computer or some other known technique. Merchant 112 is illustrated as an unauthorized merchant meaning merchant 112 is not a part of the incentive award program. As illustrated, merchant 112 has access to credit card network processor 104 via I/O port 106C by a card reader at point of sale. It is also contemplated that other authorized and unauthorized merchants are a part of the credit/debit card network 102. For simplicity, only three merchants are illustrated. For example, other authorized merchants may also be a part of the network 102 and access processor 104 via a call-in access rather than a card reader access.

The debit card system 100 includes a plurality of debit cards 114. Each debit card 114 is considered unique and is assigned to one participant of the incentive award program. Each debit card 114 has a unique account number which is generally printed on the card such as by raised lettering and may also be encoded on a magnetic strip which is part of the debit card. This unique account number corresponds to an award account of the participant. The award account is the vehicle by which the customer rewards its participants with points which allow the participants to take advantage of the incentive award debit card system 100.

In general, debit cards are very different and distinguishable from credit cards. Credit cards are a type of credit instrument such as credit accounts which allow users to buy products and/or services by drawing against their established credit line and repaying the bank or other institution which advances the credit, and if an individual having a credit card is unable to repay the full amount utilized at time of account settlement they are able to pay back the owed amount to the issuing credit card institution but a percent of interest is charged (a fee) on the amount owed. In contrast, debit cards are a type of debit instrument similar to checking accounts or other account systems which allow users to conveniently spend pre-existing cash assets which are deposited in advance by the user in the debit accounts. Any time a user would like to spend some of the deposited cash, a debit instrument such as a debit card is used to transfer a portion of the deposited cash assets to a particular merchant in exchange for products and/or services obtained by the user. A debit card offers the services of an account from which funds or points can be withdrawn without the need for paper to effectuate the debit transaction. It is an electronic account that transfers amounts from one account to another as a holder of the card uses the card to make purchases. Once a card holder or participant uses their debit card for a purchase, the purchase amount is withdrawn from their account to pay for or cover the services or products being purchased.

Another aspect of the debit card system 100 of the invention is a filter processor 116 which would preferably be supplied by and controlled by a bank or other financial institution. The filter processor 116 interfaces with the credit card network processor 104 via an I/O port 118 such as a phone line or radio frequency link. For example, the credit/debit card network 102 may be any well-known commercial network such as the Mastercard credit card network or the Visa Card credit card network and filter processor 116 may be any of a plurality of financial institutions affiliated with and linked to such networks for administering credit/debit cards issued by the financial institution. Normally, filter processor 116 would be provided with data identifying the authorized unique credit/debit card account numbers of credit/debit cards issued by the financial institution. According to the debit card system 100 of the invention, filter processor 116 also accesses program data including data identifying the authorized unique account numbers of the participants of the incentive award program. Each unique account number has been assigned to one particular participant and that participant's debit card or cards bears the assigned unique account number, which account number corresponds to the award account of the participant. In addition, the filter processor accesses program data including data identifying the authorized merchants 108 and 110. This merchant identification data which is part of the program data forms a significant aspect of the debit card system 100 of the invention. This merchant identification data is not normally needed to process credit card transactions because for each credit card transaction, it is assumed that all merchants that access the credit/debit card network 102 are part of the credit card system. In contrast, all merchants may not be part of the debit card system 100 of the invention. If there are more authorized merchants than unauthorized merchants, such merchant identification data may take the form of a list of unauthorized merchants.

In addition, the filter processor 116 accesses program data including data indicating the balance of each participant's award account. This balance is controlled and maintained by the customer and would have a point value which is converted into a currency value in the course of a debit transaction, as will be explained in greater detail below.

As illustrated in FIG. 1, the program data may be accessible to the filter processor 116 via an I/O port 120 which interconnects the filter processor 116 to a host processor 122 of the administrator. As a result of this interconnection, the program data may be provided to the filter processor 116 on a real time and/or batch basis. Optionally, it is also contemplated that an intermediary processor 124 of the administrator may be located between terminals 126 for implementing the system of the invention and the host processor 122. The intermediary processor 124 would allow the administrator to generate reports and otherwise manipulate the program data independent of the host processor 122 and independent of the I/O port 120 which interconnects the host processor 122 to the filter processor 116. Although the administrator, bank, and customer are indicated as separate entities, it is contemplated that the bank and administration may be the same entity, in which case processors 116, 122, and 124 may be a single processor computer. Alternatively, the customer may be both the administrator and/or the bank.

A debit transaction is initiated by a merchant using an initiating card having an initiating account number. The initiating card may be one of the debit cards 114 of the debit card system 100 or may be some other type of card, such as a credit card, which is not a part of the debit card system 100 but which may be used with the credit card network processor 104 to access a card user's credit. In general, credit cards and debit cards may have the same physical appearance, structure, and follow the same steps at point of purchase. Therefore, an initiating merchant may choose not to determine whether the initiating card is one of the debit cards 114 of the system or some other card. Therefore, the debit transaction is transparent to the initiating merchants to the extent that the initiating merchant does not have to distinguish between debit transactions using the debit card and transactions using a credit card and can process both debit card transactions and credit card transactions in the same manner.

Upon initiating the debit transaction, debit transaction data is provided to the credit/debit card network processor 104 via one of the I/O ports 106. For example, authorized merchant 108 may initiate a debit transaction by using its card reader to read the initiating card and provide card identification information via I/O port 106A. Simultaneously therewith, merchant identification is also provided to the credit card network processor 104. In addition, the initiating merchant also provides data indicating the amount of the initiating debit transaction.

In response to a debit transaction initiated by a merchant using the initiating card having the initiating account number, debit transaction data is transmitted from the credit card network processor to the filter processor. Preferably, this transmission process is accomplished by a means such as software executed by the credit/debit card processor which provides the debit transaction data via I/O port 118.

In summary, the filter processor 116 is provided with program data from the host processor 122 via I/O port 120 and is also provided with debit transaction data from the credit/debit card network processor 104 via I/O port 118. Preferably, the filter processor 116 includes means, such as software executed by the filter processor for evaluating the debit transaction data transmitted to the filter processor 116 by the credit/debit card network processor 118 by comparing the debit transaction data to the program data. This filter processor evaluating means or software, such as illustrated in FIGS. 2–5 and described in detail below, includes means or software for generating validating data for the debit transaction when the evaluated debit transaction data indicates that the debit transaction has been initiated by an authorized merchant 108, 110 using the unique account number of one of the participants having a sufficient balance in the participant's corresponding award account to cover the debit transaction. The validating data may be in the form of a signal provided to the merchant indicating that the debit transaction has been "APPROVED." The filter processor evaluating means or software generates invalidating data in response to the initiated debit transaction when the evaluated debit transaction data indicates that the initiating account number is not one of the authorized account numbers. The validating data may be in the form of a signal provided to the merchant indicating that the debit transaction has been "DISAPPROVED." For example, the initiating account number may be a credit card account number. Credit card account numbers are not part of the participant account numbers defined by the program data which is stored in host processor 122 and provided via I/O port 120 to filter processor 116. Initiating a transaction using such a credit card account number would result in invalidating data being generated.

The filter processor evaluating software also includes means or software for generating invalidating data for the debit transaction when the evaluated debit transaction data indicates that the initiating merchant is not one of the authorized merchants. For example, if unauthorized merchant 112 initiated a debit transaction, merchant 112 would not have an identification number which is part of the list of authorized merchants of the program data. Therefore, invalidating data for the debit transaction would be generated.

The filter processor evaluating means or software also includes means or software for generating invalidating data for the debit transaction when the evaluated debit transaction data indicates that the balance in the award account corresponding to the initiating account number is insufficient to cover the amount of the initiated debit transaction. For example, assume a debit card 114 of the debit card system 100 is used to initiate the debit transaction and that such initiating card has a participating account number which has been provided to the filter processor 116 by the host processor. Along with the account number, host processor 112 would provide the participant award account balance in points. The filter processor 116 would convert these points to a dollar value as shown in FIG. 3. If the converted dollar value does not equal or exceed the dollar value of the initiating debit transaction, invalidating data is provided to the credit card network processor 104 via I/O port 118. It is contemplated that the filter processor may convert the points into any currency denomination which corresponds to the currency denomination of the initiated debit transaction.

The filter processor also includes means or software for transmitting the validating or invalidating data to the credit card network processor 104 via I/O port 118 so that the credit card network processor provides the validating or invalidating data for the evaluated debit transaction to the initiating merchant via I/O port 106.

Figure 5B:
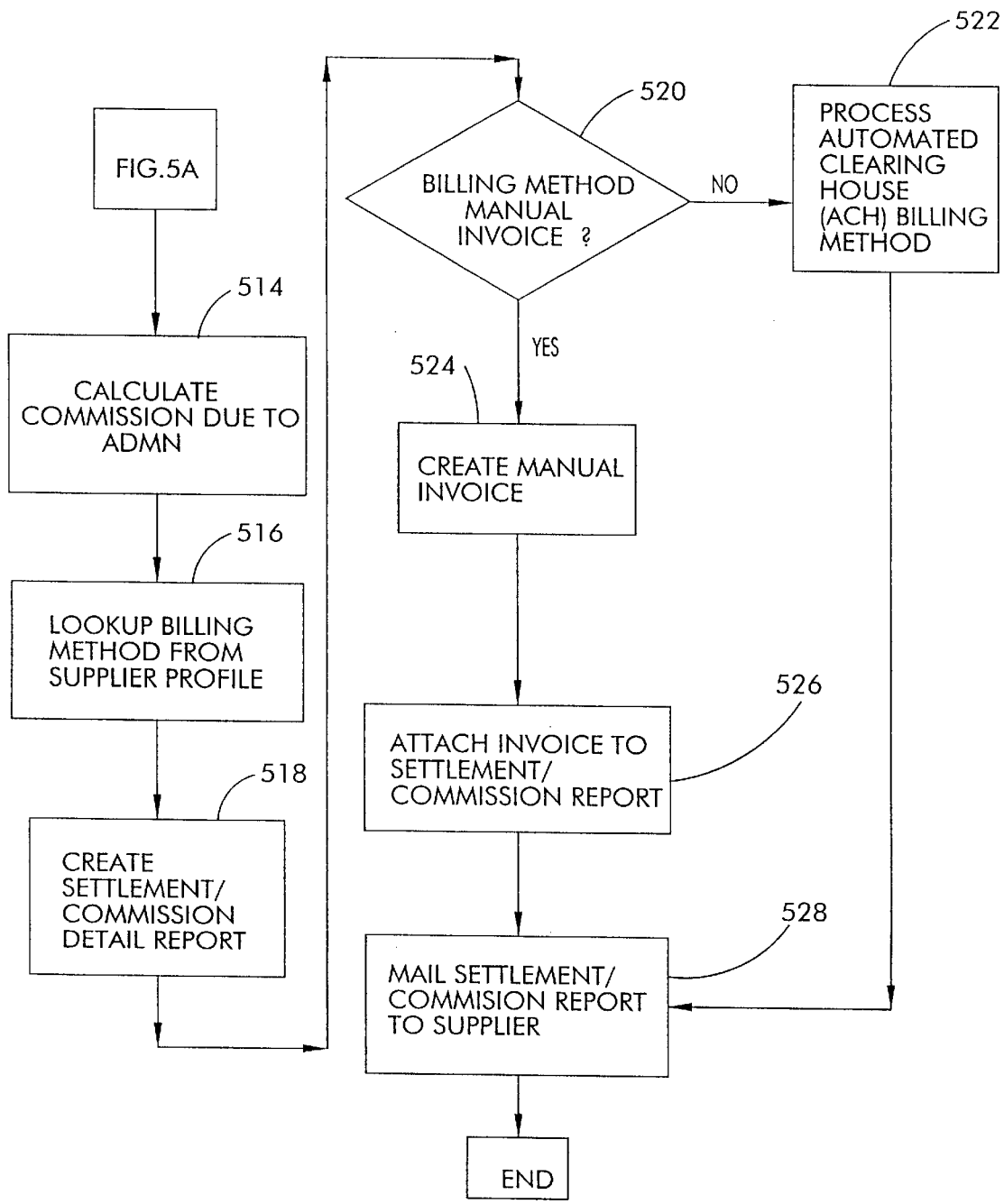

In general, a complete debit transaction according to the invention has three parts which preferably occur in the following order: a pre-authorization process including the conversion of points to a currency, such as illustrated in FIGS. 2A, 2B, and 3; a force post process such as illustrated in FIGS. 4A and 4B; and a settlements/commissions process such as illustrated in FIGS. 5A and 5B.

Referring to FIGS. 2 and 3 which describe the pre-authorization process, the process begins with a merchant 108, 110 or 112 initiating a debit transaction at step 202. In particular, the merchant submits the authorization debit transaction including the debit transaction data to the credit/debit card network 102 at step 204. Upon contacting the network 102 via one of the I/O ports 106, the processor 104 is able to determine the identity of the initiating merchant and forwards the merchant's identification data with the authorization debit transaction data at step 206. In addition, step 206 forwards a merchant identification number with the debit transaction as a fraud prevention and verification measure. The identification number may be any number or code, such as a number assigned by processor 130, which uniquely identifies each merchant. For example, in the MasterCard system, the ICA (Interbank Card Association) number may be used as the identification number.)

In addition, the identification number may include specific and local merchant location information to further identify each location. This location information may be a number or code which distinguishes each location. Such location information would be particularly useful in cases where a single merchant may have multiple locations and not all locations are authorized merchants which have the authority to access the debit card system 100 of the invention. For example, a hotel may have a registration desk location, a gift shop location and a restaurant location and only the gift shop location may be authorized to access the debit card system 100. In this case, the merchant identification information would include location information and the filter processor 116 would be programmed to distinguish between authorized and unauthorized locations as well as being programmed to distinguish between authorized and unauthorized merchants. In some existing credit card systems, the merchant identification number (such as the ICA number) and/or a merchant location number have not been uniquely assigned or utilized in broad terms. In such systems, such numbers would have to be modified to be standardized and unique so that such numbers may be used as part of the debit card system 100 and so that such numbers may be filtered by filter processor 116.

Next, the processor 104 transmits the authorization debit transaction data including the ICA and merchant numbers to the filter processor 116 of the bank via I/O port 118 by step 208. The filter processor 116 receives the authorization debit transaction data at step 210 and begins its analysis thereof.

At step 212, filter processor 116 evaluates a prefix of the initiating card identification number to determine whether the initiating card is a debit card. In general, it is contemplated that debit card account numbers would have a different prefix than credit card and other card account numbers. If the initiating card is not a debit card as defined by its prefix, the process proceeds to step 214 to generate invalidating data because the process is employing a non-debit card. If step 212 determines that the initiating card is a debit card, the process proceeds to step 216 to confirm that the initiating merchant is one of the authorized merchants defined by the program data, i.e., ICA/merchant data is part of program data. If the merchant is not an authorized merchant, the process proceeds to step 218 to indicate invalidating data because the initiating merchant is not a merchant taking part in the incentive award program and, therefore, does not have the right to use the debit card. If the initiating merchant is an authorized merchant, the process proceeds to step 220 to determine whether or not the initiating debit card has a valid debit card account number as defined by the program data. If the initiating card does not, the process proceeds to step 222 to generate invalidating data because that the debit card account number is not part of the program data.

If the initiating debit card is a valid debit card number, the process proceeds to step 224 to evaluate the DDA (demand deposit account) portion of the initiating account number. If the DDA portion is invalid, the process proceeds to step 226 to generate invalidating data because of an invalid DDA account number. If the DDA account is valid, the process proceeds to step 228 to determine the number of points available for the particular account number. If the number of points when converted to a currency does not equal or exceed the value of the initiating debit transaction, the process proceeds to step 230 to generate invalidating data because of insufficient points to complete the debit transaction.

The process continues with FIG. 3. If sufficient points are available to cover the debit transaction, the process proceeds to step 236 to debit the account balance. After step 236, the process proceeds to step 238 to generate validating data provided by the filter processor 116 via I/O port 118 to the processor 104 and eventually to the initiating merchant.

Although the system of the present invention is intended to prevent participants from exceeding the amount of points in their award account, if the authentication procedure is not fully utilized as described above, such as due to the permitted use of the equivalent of what are generally known as "floor limits;" i.e., amounts below which the merchant does not have to first seek authorization before approving the transaction, it is possible that an occasional "overdrawn condition" can occur on a temporary basis. If this occurs, the financial institution or the incentive award company can and should demand immediate clearance of the overdraft condition, such as by an equivalent cash payment or the addition of additional award points to the account. In this regard, this inadvertent overdrawn or overdraft condition is similar to that described in U.S. Pat. Nos. 4,346,442 and 4,597,046 in which the customer or participant is notified of the overdraft condition and required to clear the overdraft.

FIGS. 4A and 4B illustrate the force post process which generally occurs 24/48 hours after the completion of the pre-authorization process of FIG. 2 which resulted in the generation of validating data and a completed debit transaction. Referring to FIG. 4A, the merchant completes the debit transaction at step 402 and more particularly at step 404 by submitting a debit card force post debit transaction to processor/acquirer 130 (see FIG. 1). Next, the merchant's processor/acquirer submits the force post debit transaction through the credit card network 102 generally by access via a separate I/O port such as I/O port 106D (FIG. 1). At step 408, the credit/debit card network processor 104 forwards the ICA and merchant data with force post debit transaction.

At step 410, the credit/debit card network 102 sends the force post debit transaction data including the ICA and merchant number to the filter processor 116 of the bank. Thereafter, steps 412, 414, 420, 422, 424, and 425 parallel and essentially duplicate steps 212, 214, 220, 222, 224, and 226 of FIG. 2A. Assuming that the force post debit transaction is a debit card having a valid card number and a DE valid DDA account, the process proceeds to step 426 which permanently adjusts the participant's point balance account and to step 427 which converts the force post point value to dollars. The process then proceeds to step 428 to confirm that sufficient funds (converted from points) are available in the administrator's account to cover the debit transaction. If not, the process proceeds to step 430 to invalidate the debit transaction for insufficient funds. Otherwise, the process proceeds to step 432 to determine whether the debit transaction is a credit (refund) or debit. If it is a credit, step 434 is executed to credit the administrator's dollar account balance. Otherwise, steps 436 and 438 are executed to debit the administrator's dollar account balance against the participating award account balance and complete the processing of the force post debit transaction.

After the force post debit transaction, possibly a week to two weeks, the third and final portion of the debit transaction is executed by the posting of settlements/commissions. Referring to FIG. 5A, the settlements/commissions process begins with the administrator receiving a redemption file from the bank at step 502 indicating the details of completed force post debit transactions. These completed debit transactions now become settlement transactions which are processed at step 504 by loading the redemption file into the administrator's processor 122 or 124. The supplier's profile is looked up at step 506. If no profile is found at step 508, the settlement transaction is processed as an exception to the redemption file at step 510. Otherwise, the process proceeds with step 512 in which the administrator's processor looks up the commission percentage from the supplier's profile.

Continuing with FIG. 5B, the administrator's processor calculates the commission due to the administrator at step 514, looks up the billing method from the supplier profile at step 516, creates a settlement/commission detail report at step 518, and determines the type of billing method at step 520. If the billing method is not a manual billing method, the process proceeds to step 522 to execute a process automated clearing house (ACH) billing method. Otherwise, the process proceeds to step 524 to create a manual invoice, then to step 526 to attach an invoice to the settlement/commission report and finally to step 528, which also proceeds after step 522, to mail the settlement commission report to the supplier/merchant.

Figure 6:
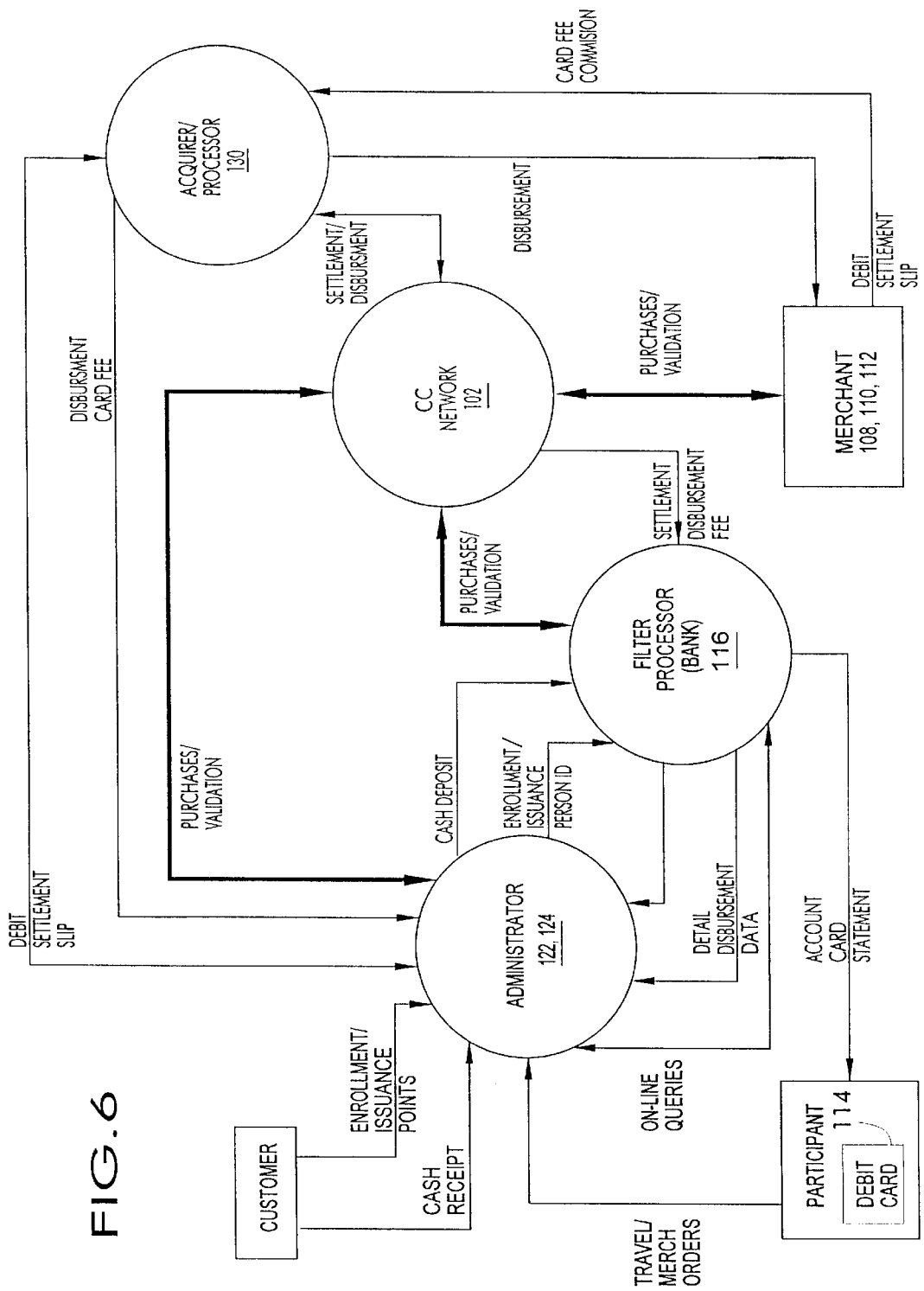
FIG. 6 is a flow chart illustrating the flow of data within a system according to the invention.

FIG. 6 illustrates the data flow between the administrator's processors 122, 124, the filter processor 116 of the bank, the credit/debit card network 102 including the I/O ports 106 and the credit/debit card network processor 104, the merchants 108, 110, 112, and the acquirer/processor 130. In addition, FIG. 6 illustrates the customer to indicate that the customer provides enrollment, issuance, and points information to the administrator. In addition, the participant with debit card 114 is illustrated to show that the participant initiates travel/merchandise orders and receives a periodic account statement from the information that is in the filter processor.

It is also contemplated that the debit card system 100 according to the invention may have several optional features. For example, the administrator may have a commission account and via an automated clearing house may debit a transaction commission amount for each validated debit transaction to the commission account of the program administrator while crediting the transaction commission amount to an account of the initiating merchant. More particularly, the credit/debit card network processor 104 may deduct the commission amount credited to the initiating merchant from the merchant's proceeds from the validated debit transaction.

Optionally, the debit cards may be embossed with information identifying the customer so that whenever a participant uses a debit card the participant is reminded that such card provides rewards which have been supplied by the customer.

It is also contemplated that many types of optional reports, some of which have been noted above and in FIG. 6, may also be generated by the debit card system 100. For example, the filter processor 116 may generate redemption reports for each merchant indicating debit card transactions by participants. In this case, the filter processor 116 generates a rewards account report for each participant indicating debit transactions by such participant and indicating the amount of points in such participant's award account.

In order to minimize the number of participant account numbers which are part of the program data provided by the host processor 122, it is contemplated that the filter processor 116 may delete from the program data authorized unique account numbers which have not initiated a debit transaction for a predetermined period of time, e.g., six months.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. In a system for implementing a program having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said system including a plurality of debit and/or credit cards, each having a unique account number corresponding to an account of the participant; the improvement comprising:

a. a filter processor interfacing with the credit/debit card network processor and accessing the following program is data:

1. data identifying the authorized unique account numbers of the participants, 2. data identifying the authorized merchants, and 3. data indicating the balance in each participant's account;

b. said filter processor including means, responsive to an initiating transaction based on an initiating account number, for transmitting from the credit/debit card network processor to the filter processor the following transaction data:

1. the initiating account number of the card initiating the transaction,
2. merchant identification data of the merchant involved in the initiating transaction, and
3. data regarding the amount of the initiated transaction;

c. said filter processor including means for evaluating the transaction data transmitted to the filter processor by the credit/debit card network processor by comparing the transaction data to the program data;

d. said filter processor evaluating means including means for generating validating data for the transaction when the evaluated transaction data indicates that the transaction involves an authorized merchant using the unique account number of one of the participants having a sufficient balance in the participant's corresponding account to cover the transaction;

e. said filter processor evaluating means including means for generating invalidating data for the transaction when the evaluated transaction data indicates that the initiating account number is not one of the authorized account numbers;

f. said filter processor evaluating means including means for generating invalidating data for the transaction when the evaluated transaction data indicates that the merchant involved in the transaction is not one of the authorized merchants;

g. said filter processor evaluating means including means for generating invalidating data for the transaction when the evaluated transaction data indicates that the balance in the account corresponding to the initiating account number is insufficient to cover the amount of the initiated transaction;

h. said filter processor including means for transmitting the validating or invalidating data to the credit/debit card network processor so that the credit/debit card network processor provides the validating or invalidating data for the evaluated transaction to the merchant involved in the transaction.

2. The filter of claim 1 wherein the amount of the initiated transaction is in a currency denomination such as dollars, wherein each account has a point value, wherein the evaluating means converts the point value of the account corresponding to the initiating account number into the currency denomination of the amount of the initiating transaction, and wherein the evaluating means generates the validating data if the converted point value equals or exceeds the amount of the initiating transaction.

3. The filter of claim 2 wherein said filter processor evaluating means comprises a banking processor.

4. The filter of claim 1 wherein the filter processor is maintained by a program administrator having a commission account and wherein the program administrator via an automated clearing house credits or deposits a transaction commission amount for each validated transaction to the commission account of the program administrator and debits or removes the transaction commission amount to an account of the merchant involved in the transaction.

5. The filter of claim 4 wherein the credit/debit card network processor deducts the commission amount credited to the merchant involved in the transaction from the merchant'S proceeds from the validated transaction.

6. The filter of claim 1 wherein the cards include embossing relating to the program.

7. The filter of claim 1 wherein the cards are debit cards having a magnetic strip encoded with a number corresponding to the unique account number of the participant whereby the transaction is transparent to the merchants involved in the transactions such that the involved merchant cannot distinguish between transactions using debit cards and transactions using credit cards.

8. The filter of claim 7 wherein at least some merchants have a card reader adapted to be connected to the I/O port and wherein the initiating transaction is initiated by reading the magnetic strip of the card.

9. The filter of claim 1 wherein the filter processor generates redemption reports for each merchant indicating card transactions by participants and wherein the filter processor generates account reports for each participant in the program indicating transactions by such participant and indicating the amount of points in such participant's account.

10. The filter of claim 1 wherein the filter processor deletes from the program data authorized unique account numbers which have not initiated a transaction for a predetermined period of time.

11. The filter of claim 1 wherein the credit/debit card network processor comprises a merchant processor linked to a switch processor and wherein the filter processor comprises a banking processor linked to an administrator's processor.

12. The filter of claim 1 wherein the filter processor is maintained by a program administrator having a balance account and wherein, during a force post portion of the transaction, the filter processor debits a transaction amount for each validated transaction to the balance account of the program administrator and credits the transaction amount to an account of the merchant involved in the transaction.

13. The filter of claim 1 wherein the system includes only debit cards.

14. A filtering method for implementing a program having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said filtering method comprising the steps of:

a. providing a plurality of cards, each assigned to one participant and having a unique account number corresponding to an account of the participant;

b. accessing the following program data:
(1) data identifying the authorized unique account numbers of the participants,
(2) data identifying the authorized merchants, and
(3) data indicating the balance in each participant's account, c. transmitting the following transaction data in response to an initiating transaction based on an initiating account number:
(1) the initiating account number of the card initiating the transaction,
(2) merchant identification data of the merchant involved in the transaction, and
(3) data regarding the amount of the initiated transaction;

d. comparing the transmitted transaction data to the program data;

e. validating the transaction when the comparing step indicates that the transaction involves an authorized merchant using the unique account number of a participant having a sufficient balance in the participant's corresponding account to cover the transaction;

f. invalidating the transaction when the comparing step indicates that the initiating account number is not one of the authorized account numbers;

g. invalidating the transaction when the comparing step indicates that the merchant involved in the transaction is not one of the authorized merchants; and h. invalidating the transaction when the comparing step indicates that the balance in the account corresponding to the initiating account number is insufficient to cover the amount of the initiated transaction.

15. The filtering method of claim 14 wherein the steps of initiating, evaluating, validating and invalidating are performed electronically whereby the transaction is paperless.

16. The filtering method of claim 14 wherein the cards are only debit cards.

17. A system for implementing a program having participants, said program permitting the participants to obtain products and/or services from authorized merchants who are part of the program, said system for use with:

a credit/debit card network which includes the authorized merchants who are part of the credit/debit card network and which also includes unauthorized merchants who are not part of the program and who are part of the credit/debit card network, each merchant having access via an input/output (I/O) port to a credit/debit card network processor of the credit/debit card network; and a plurality of cards, each assigned to one participant and having a unique account number corresponding to an account of the participant;

said system comprising:

a. a filter accessing the following program data:
  (1) data identifying the authorized unique account numbers of the participants,
  (2) data identifying the authorized merchants, and
  (3) data indicating the balance in each participant's account,
  said filter interfacing with the credit/debit card network processor;

b. said filter responsive to an initiating transaction based on an initiating account number for transmitting from the credit/debit card network processor to the filter processor the following transaction data:
  (1) the initiating account number of the card initiating the transaction,
  (2) merchant identification data of the merchant involved in the transaction, and
  (3) data regarding the amount of the initiated transaction;

c. said filter evaluating the transaction data transmitted to the filter processor by the credit/debit card network processor by comparing the transaction data to the program data;

d. said filter generating validating data for the transaction when the evaluated transaction data. indicates that the transaction involves an authorized merchant using the unique account number of one of the participants having a sufficient balance in the participant's corresponding account to cover the transaction;

e. said filter generating invalidating data for the transaction when the evaluated transaction data indicates that the initiating account number is not one of the authorized account numbers;

f. said filter generating invalidating data for the transaction when the evaluated transaction data indicates that the merchant involved in the transaction is not one of the authorized merchants;

g. said filter generating invalidating data for the transaction when the evaluated transaction data indicates that the balance in the account corresponding to the initiating account number is insufficient to cover the amount of the initiated transaction; and h. said filter transmitting the validating or invalidating data to the credit/debit card network processor so that the credit/debit card network processor provides the validating or invalidating data for the evaluated transaction to the merchant involved in the transaction.

18. The filter of claim 17 wherein the cards are only debit cards.

19. A filter for implementing a program having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said filter for use with a plurality of cards, each of the cards having a unique account number corresponding to an account; said filter comprising:

a. a filter processor accessing the following program data:
  (1) data identifying the authorized unique account number of each card,
  (2) data identifying the authorized merchants, and
  (3) data indicating the balance in each account,
  said filter processor interfacing with the credit/debit card network processor;

b. said filter processor including means, responsive to an initiating transaction based on an initiating account number, for transmitting from the credit/debit card network processor to the filter processor the following transaction data:
  (1) the initiating account number of the card initiating the transaction,
  (2) merchant identification data of the merchant involved in the transaction, and
  (3) data regarding the amount of the initiated transaction;

c. said filter processor including means for evaluating the transaction data transmitted to the filter processor by the credit/debit card network processor by comparing the transaction data to the program data;

d. said filter processor evaluating means including means for generating validating data for the transaction when the evaluated transaction data indicates that the transaction involves an authorized merchant using the unique account number of one of the cards having a sufficient balance in the card's corresponding account to cover the transaction;

e. said filter processor evaluating means including means for generating invalidating data for the transaction when the evaluated transaction data indicates that the initiating account number is not one of the authorized account numbers;

f. said filter processor evaluating means including means for generating invalidating data for the transaction when the evaluated transaction data indicates that the merchant involved in the transaction is not one of the authorized merchants;

g. said filter processor evaluating means including means for generating invalidating data for the transaction when the evaluated transaction data indicates that the balance in the account corresponding to the initiating account number is insufficient to cover the amount of the initiated transaction;

h. said filter processor including means for transmitting the validating or invalidating data to the credit/debit card network processor so that the credit card network processor provides the validating or invalidating data for the evaluated transaction to the merchant involved in the transaction.

20. The filter of claim 19 wherein the cards are only debit cards.

21. A filter for implementing a program having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said filter for use with a plurality of cards, each of the cards having a unique account number corresponding to an account; said filter comprising;

a. a filter processor accessing the following program data:
  (1) data identifying the authorized unique account number of each card,
  (2) data identifying the authorized merchants, and
  (3) data indicating the balance in each account,
  said filter processor interfacing with the credit/debit card network processor;

b. said filter processor responsive to an initiating transaction based on an initiating account number and transmitting from the credit/debit card network processor to the filter processor the following transaction data:
  (1) the initiating account number of the card initiating the transaction,
  (2) merchant identification data of the merchant involved in the transaction, and
  (3) data regarding the amount of the initiated transaction;

c. said filter processor evaluating the transaction data transmitted to the filter processor by the credit/debit card network processor by comparing the transaction data to the program data;

d. said filter processor generating validating data for the transaction when the evaluated transaction data indicates that the transaction involves an authorized merchant using the unique account number of one of the cards having a sufficient balance in the card's corresponding account to cover the transaction;

e. said filter processor generating invalidating data for the transaction when the evaluated transaction data indicates that the initiating account number is not one of the authorized account numbers;

f. said filter processor generating invalidating data for the transaction when the evaluated transaction data indicates that the merchant involved in the transaction is not one of the authorized merchants;

g. said filter processor generating invalidating data for the transaction when the evaluated transaction data indicates that the balance in the account corresponding to the initiating account number is insufficient to cover the amount of the initiated transaction;

h. said filter processor transmitting the validating or invalidating data to the credit/debit card network processor so that the credit card network processor provides the validating or invalidating data for the evaluated transaction to the merchant involved in the transaction.

22. A filtering method for implementing a program having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said filtering method comprising the steps of:

a. providing a plurality of cards, each assigned to one participant and having a unique account number corresponding to an account of the participant;

b. accessing the following program data;
  (1) data identifying the authorized unique account numbers of the participants,
  (2) data identifying the authorized merchants, and
  (3) data indicating the balance in each participant's account;

c. transmitting the following transaction data in response to an initiating transaction based on an initiating account number:
  (1) the initiating account number of the card initiating the transaction,
  (2) merchant identification data of the merchant involved in the transaction, and
  (3) data regarding the amount of the initiated transaction;

d. comparing the transmitted transaction data to the program data;

e. validating the transaction when the comparing step indicates that the transaction involves an authorized merchant using the unique account number of a participant having a sufficient balance in the participant's corresponding account to cover the transaction;

f. invalidating the transaction when the comparing step indicates that the initiating account number is not one of the authorized account numbers;

g. invalidating the transaction when the comparing step indicates that the merchant involved in the transaction is not one of the authorized merchants; and h. invalidating the transaction when the comparing step indicates that the balance in the account corresponding to the initiating account number is insufficient to cover the amount of the initiated transaction.

23. A system for implementing a program for a customer having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said system comprising:

a. a plurality of cards, each assigned to one participant and having a unique account number corresponding to an account of the participant;

b. a filter processor accessing the following program data:
   (4) data identifying the authorized unique account numbers of the participants,
   (5) data identifying the authorized merchants, and
   (6) data indicating the balance in each participant's account, said filter processor interfacing with the credit/debit card network processor;

c. means, responsive to an initiating transaction based on an initiating account number, for transmitting from the credit/debit card network processor to the filter processor the following transaction data:
   (1) the initiating account number of the card initiating the transaction,
   (2) merchant identification data of the merchant involved in the transaction, and
   (3) data regarding the amount of the initiated transaction;

d. said filter processor including means for evaluating the transaction data transmitted to the filter processor by the credit/debit card network processor by comparing the transaction data to the program data;

e. said filter processor evaluating means including means for generating validating data for the transaction when the evaluated transaction data indicates that the transaction involves an authorized merchant using the unique account number of one of the participants having a sufficient balance in the participant's corresponding account to cover the transaction;

f. said filter processor evaluating means including means for generating invalidating data for the transaction when the evaluated transaction data indicates that the initiating account number is not one of the authorized account numbers;

g. said filter processor evaluating means including means for generating invalidating data for the transaction when the evaluated transaction data indicates that the merchant involved in the transaction is not one of the authorized merchants;

h. said filter processor evaluating means including means for generating invalidating data for the transaction when the evaluated transaction data indicates that the balance in the account corresponding to the initiating account number is insufficient to cover the amount of the initiated transaction;

i. said filter processor including means for transmitting the validating or invalidating data to the credit/debit card network processor so that the credit/debit card network processor provides the validating or invalidating data for the evaluated transaction to the merchant involved in the transaction.

24. The system of claim 23 wherein the cards consist of debit cards only.

25. The system of claim 23 wherein the program comprises an incentive award program.

26. A method for implementing a program for a customer having participants, said program permitting the participants to obtain products and/or services from authorized merchants who are part of the program and who are part of a credit/debit card network, which credit/debit card network also includes unauthorized merchants who are not part of the program and who are part of the credit/debit card network, each merchant having access via an input/output (I/O) port to a credit/debit card network processor of the credit/debit card network, said method comprising the steps of:

a. providing a plurality of cards, each assigned to one participant and having a unique account number corresponding to an account of the participant;

b. accessing the following program data;
   (1) data identifying the authorized unique account numbers of the participants,
   (2) data identifying the authorized merchants, and
   (3) data indicating the balance in each participant's account;

c. transmitting the following transaction data in response to an initiating transaction based on an initiating account number:
   (1) the initiating account number of the card initiating the transaction,
   (2) merchant identification data of the merchant involved in the transaction, and
   (3) data regarding the amount of the initiated transaction;

d. comparing the transmitted transaction data to the program data;

e. validating the transaction when the comparing step indicates that the transaction involves an authorized merchant using the unique account number of a participant having a sufficient balance in the participant's corresponding account to cover the transaction, f. invalidating the transaction when the comparing step indicates that the initiating account number is not one of the authorized account numbers;

g. invalidating the transaction when the comparing step indicates that the merchant involved in the transaction is not one of the authorized merchants; and h. invalidating the transaction when the comparing step indicates that the balance in the account corresponding to the initiating account number is insufficient to cover the amount of the initiated transaction.

27. The method of claim 26 wherein the cards consist of debit cards only.

28. The method of claim 26 wherein the program comprises an incentive award program.

* * * * *

UNITED STATES PATENT AND TRADEMARK OFFICE
CERTIFICATE OF CORRECTION

PATENT NO. : 5,956,695 Page 1 of 1
APPLICATION NO. : 08/969093
DATED : September 21, 1999
INVENTOR(S) : David C. Carrithers et al.

It is certified that error appears in the above-identified patent and that said Letters Patent is hereby corrected as shown below:

Claim 1, column 10, line 61, "program is data:" should read --program data:--

Signed and Sealed this

Twenty-first Day of August, 2007

JON W. DUDAS
*Director of the United States Patent and Trademark Office*